March 31, 1970   C. W. BRANDON   3,503,366
APPARATUS FOR FORMING AND/OR AUGMENTING AN ENERGY WAVE
Original Filed June 29, 1962
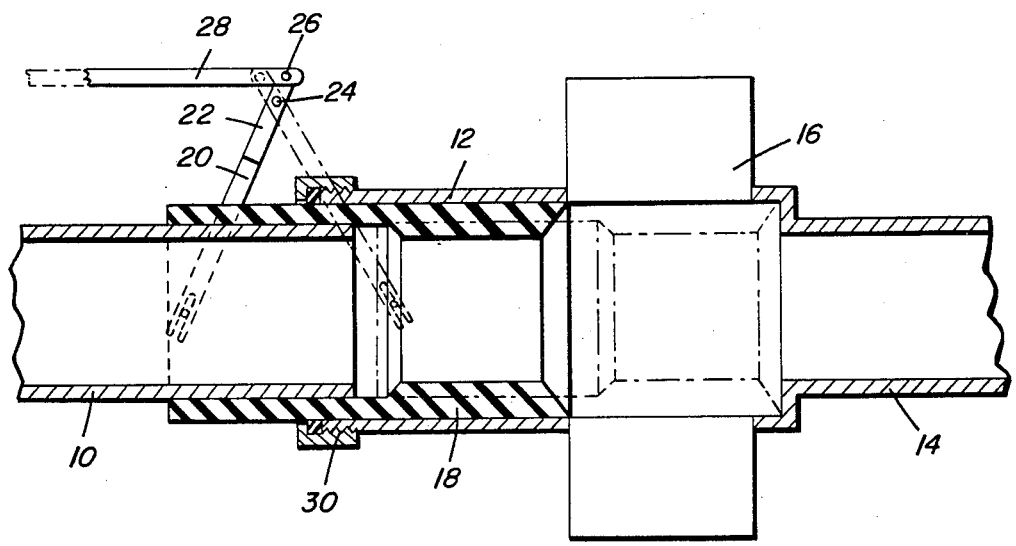
Clarence W. Brandon
INVENTOR.
BY Clarence A. O'Brien
and Harvey B. Jacobson
Attorneys

United States Patent Office 3,503,366
Patented Mar. 31, 1970

3,503,366
APPARATUS FOR FORMING AND/OR AUGMENTING AN ENERGY WAVE
Clarence W. Brandon, 2641 E. 59th St., Tulsa, Okla. 74105
Original application June 29, 1962, Ser. No. 206,207, now Patent No. 3,438,352, dated Apr. 15, 1969. Divided and this application Apr. 14, 1969, Ser. No. 815,590
Int. Cl. B06b 3/00
U.S. Cl. 116—137
41 Claims

ABSTRACT OF THE DISCLOSURE

Apparatus for effecting heat transfer that is intermittently varied to produce a pulsating flow of heat in predetermined phase relation to an energy wave propagated through an energy transmitting medium in heat exchange with heating or cooling means with respect to which the intermittent heat transfer occurs. The energy level of the wave is thereby increased.

---

This invention relates to apparatus for controlling the energy content of an energy carrying wave in an energy transmitting medium. This aplication is a division of prior copending application Ser. No. 206,207, filed June 29, 1962, which is now U.S. Patent No. 3,438,352.

The apparatus of the present invention includes a heat exchanger through which a source of heat or a cooler produces a flow of heat to or from an energy transmitting medium such as drive fluid, as one example, being injected into a subsurface formation for oil or gas recovery purposes. An energy wave is propagated through the medium for introduction into a receiver such as the aforementioned formation. Thus, the energy content of the energy wave may be increased, to cause fracture of the formation in one embodiment of the invention, by appropriately controlling the phase of the pulsating heat flow relative to the energy wave. This is accomplished by periodic or cyclic relative movement of a heat shield interrupting continuous heat transfer between the heat source for example, and the energy transmitting medium. The heat source and/or cooler is, in one embodiment, installed within a cylindrical casing, which is in controlled fluid communication with the receiver while the heat shield is disposed between the heat source and the casing for relative movement between the heat shield and the heat source. Relative movement of the heat shield may be reciprocatory, oscillatory or rotational in nature.

The accompanying drawing forming part hereof, corresponds to FIGURE 1 of the drawings in the allowed copending application, aforementioned, of which the entire specification and drawings are incorporated herein by reference as essential material necessary to support the claims or constitute an adequate disclosure of the invention.

What is claimed as new is as follows:

1. Apparatus for controlling the energy content in an energy wave in a transmitting medium, comprising means for receiving flow of energy in the transmitting medium, heat exchange means operatively positioned relative to the receiving means for establishing a predetermined level of continuous heat transfer relative to successive portions of the energy transmitting medium, means operatively connected to the heat exchange means for cyclically interrupting flow of heat relative to the receiving means to substantially reduce the level of heat transfer at a controllable frequency and change the energy content of said energy wave being propagated through said medium as the successive portions of the medium are exposed to the heat exchange means thereby producing a pulsating flow of heat relative to the receiving means.

2. The combination of claim 1 wherein said cyclic interrupting means includes a heat shield, means mounting the shield for movement between a blocking position substantially interrupting said flow of heat and a retracted position, and drive means for periodically displacing the heat shield between said blocking and retracted positions to expose the medium to the heat exchange means during a predetermined phase angle of the energy wave propagated through the medium.

3. The combination of claim 1 wherein said cyclic interrupting means includes means for movably mounting the heat exchange means relative to the receiving means, and drive means operatively connected to the heat exchange means for imparting periodic movement thereto to intermittently expose the medium to the heat exchange means.

4. The combination of claim 1 wherein the heat exchange means includes a casing having a chamber and an opening in fluid communication with the receiving means and a heater mounted within the chamber, said cyclic interrupting means being disposed within the chamber between the heater and the casing.

5. The combination of claim 4 including means for circulating a portion of the medium through the chamber in heat exchange relation to the heater.

6. The combination of claim 1 including means for cyclically introducing a coolant into the medium while flow of heat is interrupted.

7. The combination of claim 2 including means for cyclically introducing a coolant into the medium while flow of heat is interrupted.

8. The combination of claim 7 wherein said coolant introducing means is mounted on the heat shield.

9. The combination of claim 2 wherein said drive means includes a source of pressurized fluid, and reaction thrust producing means mounted by the heat shield for discharging the fluid into the medium.

10. The combination of claim 3 wherein said drive means includes a source of pressurized fluid, and reaction thrust producing means mounted by the heat exchange means for discharging the fluid into the medium.

11. The combination of claim 3 wherein the heat exchange means includes a casing having a chamber and an opening in fluid communication with the receiving means and a heater mounted within the chamber, said cyclic interrupting means being disposed within the chamber between the heater and the casing.

12. The combination of claim 11 including means for cyclically introducing a coolant into the medium while flow of heat is interrupted.

13. The combination of claim 12 wherein said coolant introducing means is mounted on the heat shield.

14. The combination of claim 11 wherein said drive means includes a source of pressurized fluid, and reaction thrust producing means mounted by the heat exchange means for discharging the fluid into the medium.

15. The combination of claim 4 wherein said cyclic interrupting means includes a heat shield, means mounting the shield for movement between a blocking position substantially interrupting said flow of heat and a retracted position, and drive means for periodically displacing the heat shield between said blocking and retracted positions to expose the medium to the heat exchange means during a predetermined phase angle of the energy wave propagated through the medium.

16. The combination of claim 15 wherein said drive means includes a source of pressurized fluid, and reaction thrust producing means mounted by the heat shield for discharging the fluid into the medium.

17. The combination of claim 1 wherein said heat exchange means includes a source of heat derived from atomic reaction.

18. The combination of claim 1 wherein said receiving means is a subsurface formation fractured by the pulsating flow of heat and the energy wave carried thereto by the energy transmitting medium.

19. The combination of claim 18 wherein said heat exchange means includes a source of heat derived from atomic reaction.

20. The combination of claim 18 wherein the medium is a drive fluid.

21. The combination of claim 18 including means for cyclically introducing a coolant into the medium while flow of heat is interrupted.

22. The combination of claim 21 wherein said coolant contains a gas.

23. The combination of claim 1 wherein the heat exchange means includes a casting having a chamber, a heater mounted within the chamber and means on the casing for controlling fluid communication between the chamber and the medium.

24. The combination of claim 23 wherein said cyclic interrupting means includes a heat shield, and means movably mounting the heat shield between the casing and the heater.

25. The combination of claim 24 including means for circulating a portion of the medium through the chamber in heat exchange relation to the heater.

26. The combination of claim 24 including means for cyclically introducing a coolant into the medium while flow of heat is interrupted.

27. The combination of claim 26 wherein said coolant introducing means is mounted on the heat shield.

28. The combination of claim 1 including means for propagating said energy wave through the medium.

29. The combination of claim 23 wherein the heat exchange means further includes a cooler mounted within the chamber.

30. The combination of claim 1 wherein said heat exchange means includes a source of heat and said receiving means is an oil or gas containing formation.

31. The combination of claim 30 wherein said medium is a drive fluid.

32. The combination of claim 30 wherein said source of heat is from atomic reaction.

33. The combination of claim 30 wherein said medium is the oil or gas of the formation.

34. The combination of claim 31 wherein said drive fluid contains a gas.

35. The combination of claim 30 including means for cyclically introducing a coolant into the medium while flow of heat is interrupted.

36. The combination of claim 34 wherein said coolant contains a gas.

37. The combination of claim 32 including means for cyclically introducing a coolant into the medium while flow of heat is interrupted.

38. The combination of claim 37 wherein said coolant contains a gas.

39. The combination of claim 33 wherein said source of heat is from atomic reaction.

40. The combination of claim 39 including means for cyclically introducing a coolant into the medium while flow of heat is interrupted.

41. The combination of claim 40 wherein said coolant means contains a gas providing means for production of the medium from the formation.

References Cited

UNITED STATES PATENTS

| | | | |
|---|---|---|---|
| 1,117,444 | 11/1914 | Robinson | 165—96 |
| 1,747,011 | 2/1930 | Kerr | 122—459 |
| 1,925,032 | 8/1933 | Dunner | 165—96 |
| 2,136,626 | 11/1938 | Lind | 165—86 |
| 2,549,464 | 4/1951 | Hartley | 290—1 |
| 2,805,048 | 9/1957 | Angelert | 165—81 |
| 2,836,033 | 5/1958 | Marrison | 60—24 |
| 2,839,276 | 6/1958 | Rossi | 165—81 |
| 3,016,893 | 1/1962 | Brown | 165—154 |
| 3,133,591 | 5/1964 | Brandon | 166—39 |

LOUIS J. CAPOZI, Primary Examiner

U.S. Cl. X.R.

166—39